United States Patent
Mullis, II et al.

(10) Patent No.: US 8,010,959 B2
(45) Date of Patent: Aug. 30, 2011

(54) SYSTEM AND METHOD FOR UPDATING DEVICE DRIVERS

(75) Inventors: Samuel L. Mullis, II, Raleigh, NC (US); Philip Elcan, Hillsborough, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1049 days.

(21) Appl. No.: 11/838,930

(22) Filed: Aug. 15, 2007

(65) Prior Publication Data

US 2008/0127165 A1 May 29, 2008

Related U.S. Application Data

(63) Continuation-in-part of application No. 11/564,553, filed on Nov. 29, 2006.

(60) Provisional application No. 60/944,227, filed on Jun. 15, 2007.

(51) Int. Cl.
*G06F 9/44* (2006.01)
(52) U.S. Cl. ...................................................... 717/173
(58) Field of Classification Search ........... 717/168–173
See application file for complete search history.

(56) References Cited

U.S. PATENT DOCUMENTS

| | | | | |
|---|---|---|---|---|
| 5,241,402 | A * | 8/1993 | Aboujaoude et al. | 358/406 |
| 6,640,334 | B1 * | 10/2003 | Rasmussen | 717/171 |
| 7,415,563 | B1 * | 8/2008 | Holden et al. | 710/305 |
| 7,512,833 | B1 * | 3/2009 | Murphy et al. | 714/5 |
| 2001/0053688 | A1 * | 12/2001 | Rignell et al. | 455/414 |
| 2002/0138567 | A1 | 9/2002 | Ogawa | |
| 2003/0202408 | A1 * | 10/2003 | Chobotaro et al. | 365/200 |
| 2004/0230797 | A1 * | 11/2004 | Ofek et al. | 713/168 |
| 2004/0255179 | A1 * | 12/2004 | Mayer | 714/1 |
| 2005/0047046 | A1 * | 3/2005 | Natarajan | 361/115 |
| 2005/0253934 | A1 * | 11/2005 | Yamagishi et al. | 348/222.1 |
| 2005/0278461 | A1 | 12/2005 | Ohta | |
| 2006/0117193 | A1 * | 6/2006 | Gosselin et al. | 713/300 |
| 2006/0129848 | A1 * | 6/2006 | Paksoy et al. | 713/193 |
| 2006/0130073 | A1 | 6/2006 | Faist et al. | |
| 2006/0150177 | A1 * | 7/2006 | Liu et al. | 717/168 |
| 2006/0244986 | A1 | 11/2006 | Ferlitsch | |
| 2007/0033265 | A1 * | 2/2007 | Anderson et al. | 709/217 |
| 2007/0198995 | A1 * | 8/2007 | Dellacona | 719/321 |
| 2007/0204144 | A1 * | 8/2007 | Gafken et al. | 713/2 |
| 2008/0005733 | A1 * | 1/2008 | Ramachandran et al. | 717/168 |
| 2008/0037781 | A1 * | 2/2008 | Kocher et al. | 380/201 |
| 2008/0168153 | A1 * | 7/2008 | Boesch | 709/217 |

FOREIGN PATENT DOCUMENTS

EP   1659489 A1   5/2006

OTHER PUBLICATIONS

International Search Report mailed Jun. 16, 2008 in PCT/US2008/057544, filed Mar. 19, 2008.
International Preliminary Examination Report mailed Jul. 15, 2009 re: International Application No. PCT/US2008/057544.

\* cited by examiner

*Primary Examiner* — Anna Deng
(74) *Attorney, Agent, or Firm* — Coats & Bennett, P.L.L.C.

(57) ABSTRACT

A host connects to a peripheral device having upgraded firmware. The host also includes a device driver to communicate with the peripheral device. If the device drivers currently installed on the host are not compatible with the upgraded firmware, upgraded device drivers are automatically downloaded to the host from the peripheral device. Once installed on the host, the peripheral device is reset and the upgraded device drivers are used to communicate with the peripheral device.

15 Claims, 2 Drawing Sheets

SYSTEM AND METHOD FOR UPDATING DEVICE DRIVERS

RELATED APPLICATIONS

This application claims the benefit of U.S. Provisional Patent Application 60/944,227, filed on Jun. 15, 2007, and is a continuation-in-part application of co-pending U.S. application Ser. No. 11/564,553, filed on Nov. 29, 2006. Both the '227 application and the '553 application are incorporated herein by reference.

BACKGROUND

The present invention relates generally to peripheral devices, and particularly to systems and methods for updating device drivers associated with those peripheral devices.

Some host devices, such as laptop computers, can communicate with a wireless network using a plug-in peripheral device commonly referred to as a "PC card." PC cards, which may connect to the computer via a Universal Serial Bus (USB) connection, include a radio frequency (RF) transceiver and an integrated antenna. Although capabilities generally differ, PC cards can send and receive data to and from the wireless network at a speed that is substantially similar to that of a fixed connection. Thus, it is possible for laptop users to communicate with one or more remote parties, browse the Internet, or send and receive email from almost anywhere on Earth.

PC cards and other peripheral devices comprise various hardware components—some of which include embedded software programs called "firmware." Generally, firmware is responsible for performing a variety of low-level tasks, and may be upgraded from time to time to fix bugs, add or alter functionality, or improve the performance and reliability of the peripheral device. However, upgrading firmware can create a variety of problems.

For example, laptop computers typically require their own software programs called "device drivers" to allow user applications to communicate with the PC card. As such, the device drivers should be compatible with whatever version firmware is running on the PC card; however, updating the firmware with a new version can introduce incompatibilities between the two. That is, the device drivers that were once appropriate for use prior to a firmware upgrade may not be compatible with the new firmware version. This can be problematic because the incompatibilities may cause the PC card to become inoperable.

SUMMARY

The present invention automatically updates one or more device drivers resident on a host device when firmware on a peripheral device is upgraded. In one exemplary embodiment, a host processor determines whether the current device drivers for the peripheral device are compatible with the upgraded firmware. If the two are compatible, the host continues to load and use the current drivers for the peripheral device. If not, the controller automatically updates the currently installed device drivers with upgraded device drivers stored in memory of the peripheral device. Once the upgraded device drivers are installed, the peripheral device is reset. This causes the host to load the upgraded device drivers into memory so that it can communicate with the peripheral device using those upgraded device drivers.

DETAILED DESCRIPTION

The present invention relates to a system and method for updating device drivers resident on a host device as part of a firmware upgrade process. Particularly, a peripheral device includes firmware that has been upgraded to a new or different version. During the upgrade process, the host automatically checks its currently installed device drivers to determine if they are compatible with the upgraded firmware. If the current device drivers on the host are compatible, the host simply communicates with the peripheral device using those installed device drivers. If not, the host automatically replaces the outdated device drivers with upgraded device drivers stored in memory of the peripheral device.

Figure 1:
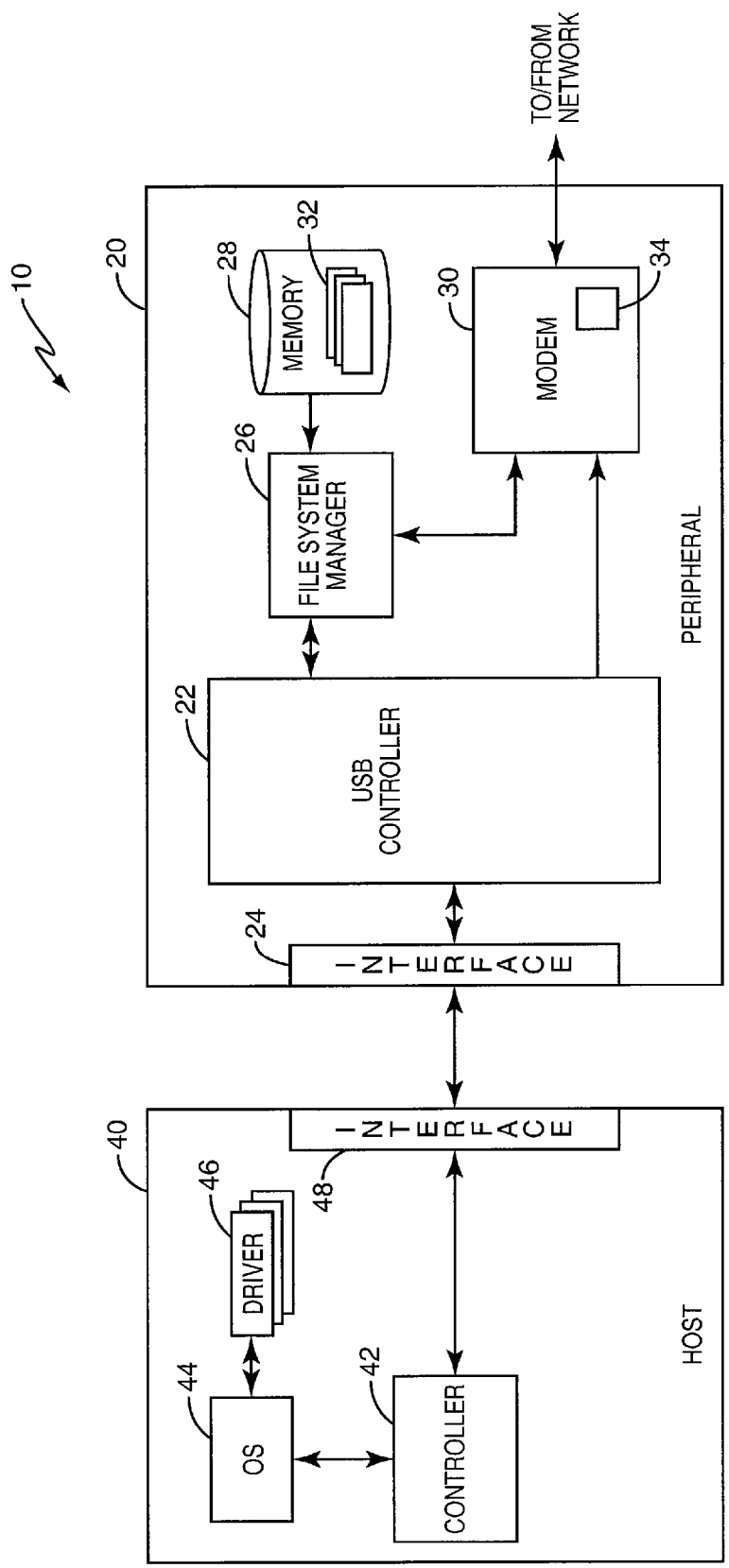
FIG. 1 is a block diagram of a peripheral device connected to a host device according to one embodiment of the present invention.

FIG. 1 illustrates a system 10 suitable for use with one embodiment of the present invention. System 10 comprises a peripheral device 20 and a host device 40. Generally, the peripheral device 20 connects to and operates under the control of host device 40. In this embodiment, peripheral device 20 comprises a modem card and host device 40 comprises a computing device. Together, the host device 40 and peripheral device 20 provide a user with the capability to communicate with remote parties via a wireless network (not shown). However, these particular labels and their associated functions are for illustrative purposes only. Peripheral device 20 may comprise any peripheral known in the art such as a mass storage device, an MP3 player, or the like. Similarly, host device 40 may be any type of electronic or computing device including, but not limited to, laptop and notebook computers, cellular telephones, satellite phones, and Personal Digital Assistants (PDAs).

Host device 40 comprises a host processor 42, an operating system (OS) 44, one or more device drivers 46, and a peripheral device interface 48 to communicatively connect host device 40 to peripheral device 20. The host processor 42 controls the operation of host device 40 according to the instructions and data associated with OS 44. The host processor may comprise one or more microprocessors, microcontrollers, hardware circuits, firmware, or a combination thereof. OS 44 comprises a set of computer programs stored in memory of the host device 40 that manage the hardware and software resources of the host device 40. As is known in the art, the OS 44 typically processes system input and user input, and performs basic computing tasks. Such tasks include controlling and allocating memory, prioritizing system requests, facilitating networking, and managing file systems. OS 44 may be any operating system known in the art; however, some of the most popular include WINDOWS, NT, LINUX, UNIX, and MAC OS X.

The device drivers 46 are software programs stored in memory that permit host device 40 to communicate with and control peripheral devices 20. In the exemplary embodiment, peripheral device 20 can function as a modem 30. As such, device drivers 46 may include one or more modem device drivers to communicate with the modem 30. In other embodiments, the peripheral device 20 may emulate a USB-compatible mass storage device. Therefore, the device drivers 46 may also include a mass storage device driver to communicate with the peripheral device 20 as a mass storage device.

The peripheral device interface 48 enables communication between the host device 40 and peripheral device 20. The peripheral device interface 48 may comprise any known type of interface, such as a USB interface, FIREWIRE, or other serial or parallel interface.

The peripheral device 20 comprises a USB controller 22 connected to an interface 24, a file system manager 26, memory 28, and a modem 30. The memory 28 may store one or more "upgraded" device drivers 32. As described in more detail below, the "upgraded" device drivers 32 correspond to the version of the firmware 34 on modem 30. The device drivers 32 may be sent to host device 40 whenever firmware 34 is upgraded as hereinafter described. This helps to ensure that the host device 40 always has the most current device drivers.

USB controller 22 controls the operation of peripheral device 20. USB controller 22 may comprise a microprocessor, microcontroller, hardware circuits, or a combination thereof. One function of the USB controller 22 is to change the configuration of the peripheral device 20. For example, when the peripheral device 20 is connected for the first time to host device 40, the peripheral device 20 may initially present itself as mass storage device to avoid unknown device errors until the proper drivers are installed. An "autorun" program stored in the memory 28 can be sent to host device 40, and automatically executed to install device drivers on host device 40. Once the correct drivers are installed, the USB controller 22 can change from the default configuration (e.g., mass storage device) to a standard configuration (e.g., modem configuration).

The file system manager 26 is a software module that controls access to memory 28. Particularly, file system manager 26 receives and processes file access commands from host device 40. The file system manager 26 can operate in a conventional fashion to open and close files, read files, write files, delete files, etc.

Modem 30 allows the user to communicate with one or more remote parties and/or servers via a communication network (not shown). If host device 40 has the appropriate modem device drivers 46 installed, host device 40 can send and receive data with modem 30 via the USB controller 22. Modem 30 includes firmware 34 that may be upgraded from time to time to fix bugs, add functionality, or improve the performance and reliability of modem 30. These changes may negatively affect the ability of host device 40 to communicate with peripheral device 20. Specifically, upgraded firmware 34 may introduce incompatibilities between the device drivers 46 currently installed on host device 40 and the firmware 34. Such incompatibilities are problematic because they may render modem 30 inoperable.

According to the present invention, the device driver 46 for the modem 30 includes code to automatically check the minimum driver version for the currently installed firmware 34 and to initiate an installation process to install appropriate device drivers 46 stored in memory of the peripheral device 20 as necessary. In one exemplary embodiment, the host processor 42 checks the compatibility of its currently installed device drivers 46 each time the device driver is loaded. After starting the loading process, the host processor 42 determines the minimum driver version needed to operate with the currently installed firmware 34 and compares the current driver version of the installed device driver 46 with the minimum driver version for the currently installed firmware 34. The code for performing this compatibility check may be included in the device driver 46.

If the driver version of the currently installed device driver 46 is greater than or equal to the minimum driver version for the firmware 34, the device driver 46 may be loaded or continue to operate. If the driver version of the currently installed device driver 46 is less than the minimum driver version for the firmware 34, the host processor 42 automatically initiates an installation procedure to install the appropriate device drivers 46 stored in memory of the peripheral device 20. The code for initiating the installation of the new driver may also be included in the device driver 46. Once host processor 42 has replaced the currently installed device drivers 46 with new device drivers, the peripheral device 20 is automatically re-started so that the host processor 42 can load the upgraded device drivers 32.

Various techniques may be employed to determine the minimum driver version for the currently installed firmware 34 of the modem 30. One method is to hard code the minimum driver version into the firmware 34, which can then be interrogated by the host processor 42. The host processor 42 may, for example, issue a predetermined AT command to the modem 30 to get the minimum driver version for the currently installed firmware 34. The firmware 34 may report the minimum driver version as a custom USB descriptor. Alternatively, the minimum driver version could be stored in a predetermined file or address in the memory 28 of the peripheral device that can be accessed by the host processor 42 through the file system manager 26. One advantage of this approach is that the firmware code itself does not have to change to update the minimum driver version; only the predetermined file or memory address needs to be updated.

Figure 2:
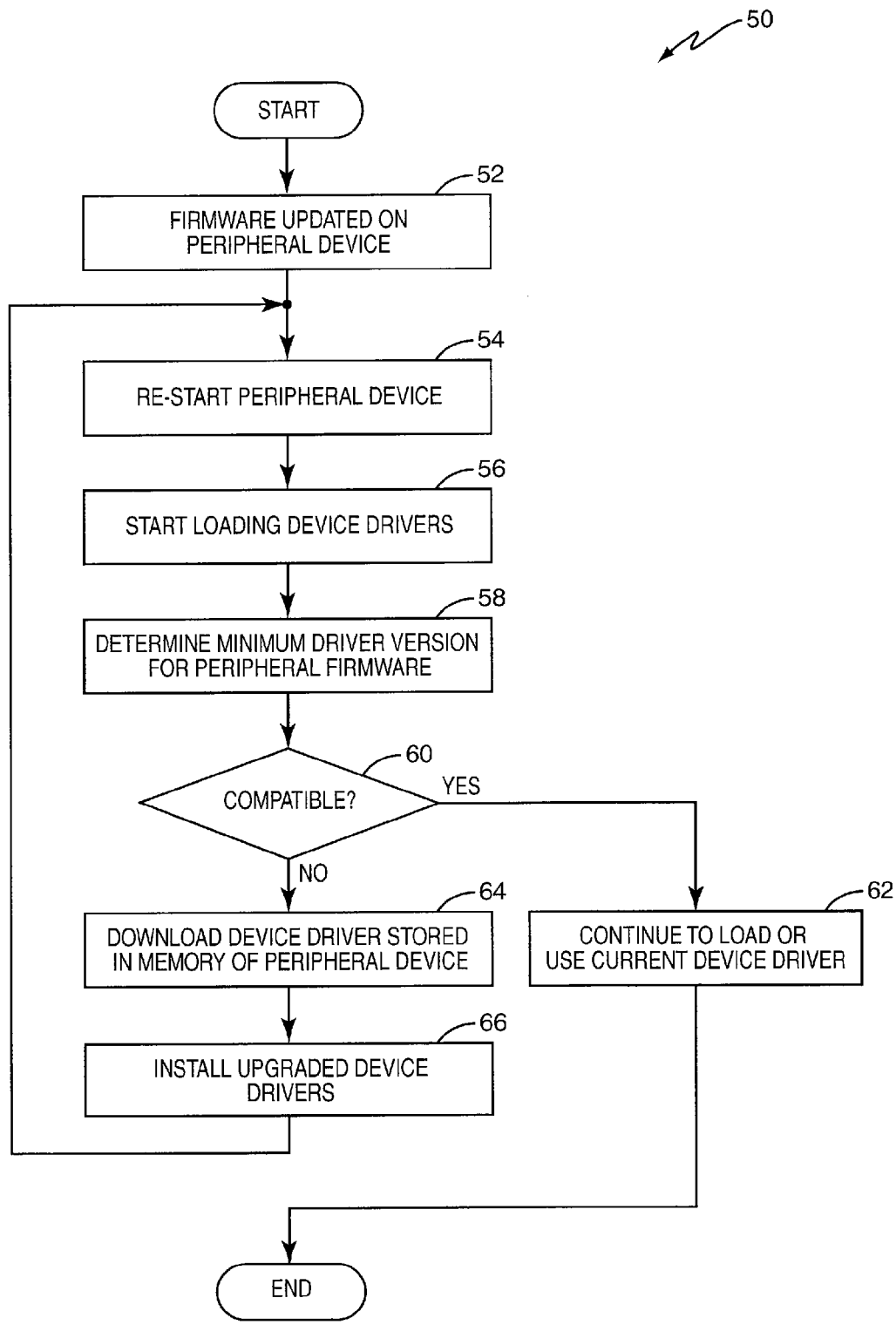
FIG. 2 is a flow diagram that illustrates a method of updating device drivers according to one embodiment of the present invention.

FIG. 2 illustrates a method 50 of updating the device drivers 46 on host device 40 as part of the upgrade process for firmware 34. Method 50 begins when the firmware 34 on modem 30 is upgraded (box 52). During the firmware upgrade, new device drivers compatible with the upgraded firmware 34 may be copied into memory 28 of peripheral device 20. After the upgrade, the user re-starts the peripheral device 20 (box 54). This may be done automatically responsive to a signal sent by host processor 42, for example, or by cycling the power to host device 40 or peripheral device 20, or disconnecting/reconnecting the peripheral device 20 to host device 40. In each case, OS 44 will automatically detect the presence of peripheral device 20 and start to load the device drivers 46 for the peripheral device 20 (box 56). In this embodiment, the peripheral device 20 includes a modem 30. Therefore, the device drivers 46 include those used by host device 40 to communicate with modem 30.

Because the firmware upgrade may negatively affect the ability of host device 40 to communicate with modem 30, host processor 42 next determines whether the currently installed device drivers 46 used for modem 30 also need upgrading. More specifically, the host processor 42 determines the minimum driver version required by the currently installed firmware 34 on the modem 30 (block 58). The host processor 42 can interrogate the firmware 34 to obtain the minimum driver version. Alternatively, the host processor 42 can be read the minimum driver version from a predetermined file or address in the memory 28 of the peripheral device 20.

After the minimum driver version is determined, the host processor 42 checks whether the currently installed device drivers 46 are compatible with the upgraded firmware 34 (box 60). If the driver version of the currently installed device drivers 46 equals or exceeds the minimum driver version, update of the device driver 46 is not required. In this case, the host processor 42 will continue loading the current device driver 46 and the process ends (box 62). Conversely, if the driver version for the currently installed device driver 46 is less than the minimum driver version, the host processor 42 will upload and install the new device driver 46 stored in memory of the peripheral device 20 (boxes 64 and 66). An exemplary process for installing device drivers is described in co-pending application Ser. No. 11/564,553, titled "Methods, Devices and Computer Program Products for Automatically Installing Device Drivers from a Peripheral Device Onto A Host Computer" filed on Nov. 29, 2006, which is incorporated herein in its entirety by reference.

After the new device driver is installed in the host device 40, the peripheral device 20 is then reset as previously described (box 54). On this pass, however, the host processor 42 will determine that the device drivers 46 on host device 40 are the upgraded device drivers, and therefore, are compatible with the upgraded firmware 34 (boxes 56-60). As such, host processor 42 will configure the host device 40 to operate with modem 30 (box 62).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of updating a device driver on a host device comprising:
   automatically detecting a peripheral device having a modem after firmware of the modem has been upgraded;
   determining, by the host device, whether a currently installed device driver on the host device is compatible with the upgraded firmware of the modem responsive to the detection of the peripheral device and
   downloading an upgraded device driver from the peripheral device to the host device if the currently installed device driver is not compatible with the upgraded firmware of the modem.

2. The method of claim 1 wherein determining whether the currently installed device driver on the host device is compatible with the upgraded firmware of the modem comprises determining a minimum driver version for the upgraded firmware of the modem.

3. The method of claim 2 wherein determining whether the currently installed device driver on the host device is compatible with the upgraded firmware of the modem further comprises comparing a current driver version for the currently installed driver with the minimum driver version for the upgraded firmware of the modem.

4. The method of claim 3 wherein the upgraded device driver is downloaded if the current driver version is less than the minimum driver version for the upgraded firmware of the modem.

5. The method of claim 2 wherein determining the minimum driver version for the upgraded firmware of the modem comprises reading the minimum driver version from a file stored in a memory of the peripheral device.

6. The method of claim 2 wherein determining the minimum driver version for the upgraded firmware of the modem comprises interrogating the upgraded firmware of the modem for the minimum driver version.

7. The method of claim 1 further comprising installing the upgraded device driver at the host device.

8. The method of claim 7 further comprising generating a signal to reset the peripheral device after the upgraded device driver has been installed at the host device.

9. A host device comprising:
   an interface to connect the host device to a peripheral device having a modem; and
   a host processor configured to:
      automatically detect the peripheral device after firmware of the modem has been upgraded;
      determine the compatibility of a currently installed device driver on the host device with the upgraded firmware of the modem; and
      download an upgraded device driver from the peripheral device to the host device if the currently installed device driver is not compatible with the upgraded firmware of the modem.

10. The host device of claim 9 wherein the host processor is configured to determine the compatibility of the currently installed device driver by comparing a current driver version to a minimum driver version for the upgraded firmware of the modem.

11. The host device of claim 10 wherein the host processor is further configured to download the upgraded device driver from the peripheral device if the current driver version is less than the minimum driver version for the upgraded firmware of the modem.

12. The host device of claim 10 wherein the host processor is configured to determine the minimum driver version for the upgraded firmware of the modem by reading the minimum driver version for the upgraded firmware of the modem from a predetermined file stored in memory of the peripheral device.

13. The host device of claim 10 wherein the host processor is configured to determine the minimum driver version for the upgraded firmware of the modem by interrogating the upgraded firmware of the modem.

14. The host device of claim 9 wherein the host processor is further configured to install the upgraded device driver on the host device.

15. The host device of claim 14 wherein the host processor is further configured to generate a signal to reset the peripheral device after installing the upgraded device driver.

* * * * *